(12) United States Patent
Bhaskar

(10) Patent No.: US 7,161,690 B1
(45) Date of Patent: Jan. 9, 2007

(54) METHOD FOR ENHANCING RENDERING OF PICTURE ELEMENTS

(75) Inventor: Danke Mahesh Bhaskar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 927 days.

(21) Appl. No.: 09/616,194

(22) Filed: Jul. 14, 2000

Related U.S. Application Data

(60) Provisional application No. 60/149,356, filed on Aug. 18, 1999.

(51) Int. Cl.
*G06F 1/03* (2006.01)
(52) U.S. Cl. ........................... 358/1.1; 358/1.14
(58) Field of Classification Search .......... 358/1.1–1.2, 358/1.9, 1.14, 1.16
See application file for complete search history.

(56) References Cited

U.S. PATENT DOCUMENTS

| | | | | |
|---|---|---|---|---|
| 4,862,392 A | * | 8/1989 | Steiner | 345/427 |
| 5,533,175 A | * | 7/1996 | Lung et al. | 358/1.16 |
| 5,918,225 A | * | 6/1999 | White et al. | 707/3 |
| 5,999,200 A | * | 12/1999 | Harkin et al. | 345/522 |

* cited by examiner

*Primary Examiner*—Thomas D. Lee
*Assistant Examiner*—Stephen Brinich
(74) *Attorney, Agent, or Firm*—W. James Brady; Frederick J. Telecky, Jr.

(57) ABSTRACT

For a given lookup table, maximum and minimum values of index values are determined. The lookup table is expanded in both directions by replicating the lowest and highest values to take care of these maximum and minimum values. This reduces the rendering clock count for each pixel.

4 Claims, 2 Drawing Sheets

METHOD FOR ENHANCING RENDERING OF PICTURE ELEMENTS

This application claims priority under 35 USC § 119(e)(1) of provisional application No. 60/149,356, filed Aug. 18, 1999.

COPYRIGHT AUTHORIZATION

A portion of the disclosure of this patent document contains material which is subject to copyright protection. The owner, Texas Instruments Inc., has no objection to the facsimile reproduction by anyone of the patent disclosure, as it appears in the Patent and Trademark office patent files or records of any country, but otherwise reserves all rights whatsoever.

FIELD OF INVENTION

This invention relates to enhancing the rendering of picture elements or pixels and more particularly to the rendering of pixels using computer operation codes or opcodes.

BACKGROUND OF INVENTION

Today graphical pictures may be printed or displayed on a raster scan screen. The pictures may be computer generated or may be otherwise generated and then scanned by an electronic graphic scanner that converts an image into a video raster graphic image. The smallest element on such a screen or printer is a pixel or picture element.

The present invention relates to raster image processing software used in printer or screen controllers. The raster image processing (RIP) in computer graphics is the component (hardware, software or both) that prepares data for raster output (screen or printer). The software operation codes or opcodes is that part of the machine instruction that tells the computer what to do. The whole task of printing can be divided into the two subtasks of interpretation and rendering.

Out of the total processing time interpretations takes about 20 percent of the time whereas rendering takes around 80 percent of the time. During interpretations each line of source language is translated into machine language and then executed. In rendering, a 3-D image is created that incorporate the simulation of lighting effects, such as shadows and reflection.

The shading operation code (opcode) is one of the many opcodes which constitutes rendering subsystems. While using the software packages like Adobe Illustrator of Adobe Systems, Inc., Mountain View, Calif., the programmer draws an arbitrary figure and chooses the type of shading to generate the special effects. The Adobe system uses PostScript (a page description language) commands. These commands are language statements in ASCII text that are translated into a printer machine language by a PostScript interpreter built into the printer. When a Postscript file is submitted to a printer, during interpretation stage, this arbitrary figure is divided into graphics rendering primitives where the gray value at each and every pixel is a linear or nonlinear function of its position in the primitive. A primitive is a graphic element such as a point, line, arc, cone or sphere used as a building block for creating images.

To optimize the performance, the nonlinear function is represented by a lookup table with predefined values in an array, matrix, etc. or within a data file. The index into the lookup table is calculated for every pixel using the base value and the gradient in both x and y directions as well as the position of the pixel in the primitive. Sometimes the index does not fall into the lookup table because of precision problems associated with the computations or may be due to the nonlinear nature of the function associated with it.

The core loop of the opcode should have two boundary checks for the index to avoid accessing outside the lookup table area. These checks introduce additional instructions and hence increases the time taken for rendering one pixel.

It is desirable to provide a method for reducing the time take for rendering each and every pixel in the case of shading opcodes.

SUMMARY OF INVENTION

In accordance with one embodiment of the present invention for a given opcode table, maximum and minimum values of index are determined and the lookup table is expanded in both directions to take care of these maximum and minimum values and the checks in the core loop are removed, reducing the total rending clock count.

DESCRIPTION OF PREFERRED EMBODIMENTS OF THE PRESENT INVENTION

Figure 1:
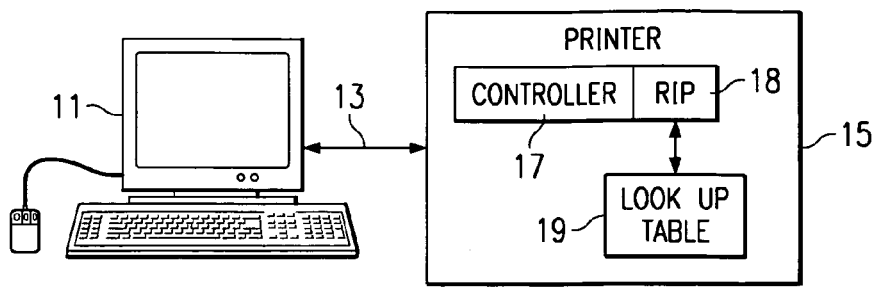
FIG. 1 is a diagram of the system according to one embodiment of the present invention.

Referring to FIG. 1 there is illustrated a diagram of the system according to one embodiment of the present invention. A programmer (user) draws an arbitrary figure at a computer terminal 11 that is connected via connector lead 13 to a raster output device such as a printer 15. The programmer chooses the type of shading to generate special 3-D image effects. The printer or screen 15 includes a controller 17. The controller 17 includes a raster image processor (RIP) 18 that prepares the data for the raster output. The RIP processor 18 includes software. The RIP software includes, for example, a page description language like Postscripts as in Adobe Illustrator of Adobe Systems. Postscripts level −3 supports different types of shading like radial and axial shading and also supports linear and nonlinear (based on some function) shading. The RIP software has the two main tasks of interpretation and rendering.

During the interpretation stage (step 21 in FIG. 2) the drawn figure is divided into graphic primitives where the grey value at each and every pixel is a linear or nonlinear functions of its position in the primitive. The second step is rendering (Step 23 in FIG. 2.). In rendering, a 3-D image is created that incorporate the simulation of lighting effects. For the non-linear function (Step 25), an index into a lookup table (19 in FIG. 1) is generated in generator 18 (FIG. 1) by using the initial grey value and the rate of change along both x and y axes. The lookup table 19 is given for a range of index values, but the maximum and minimum values of the index may cover a larger range (may be due to the precision problems that generates them). If the index for the particular pixel does not fall into the lookup, the pixel is rendered with grey value given by closest boundary index. For the present case, lookup table 19 will be given for 0 to 255 index values, whereas the minimum to maximum values of the index will be −255 to 511.

The following are the inputs given for a graphics primitive to be rendered.
1. Init_value: The initial index value of a graphics primitive.
2. Delta_x: Rate of change of index value along the x axis.
3. Delta_y: Rate of change of index value along the y axis.
4. Look up table with 256 values representing a complex function.

Figure 3:
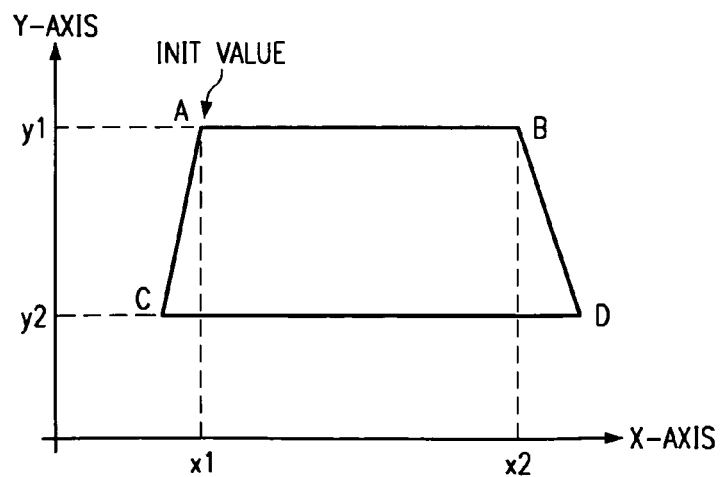
FIG. 3 illustrates rendering function.

Referring to FIG. 3 there is illustrated the rendering function.
The index value at A=Init_value
The index value at B=Init_value+Delta_x *(x2−x1)
The index value at C=Init_value+Delta_y *(y2−y1)

Figure 4:
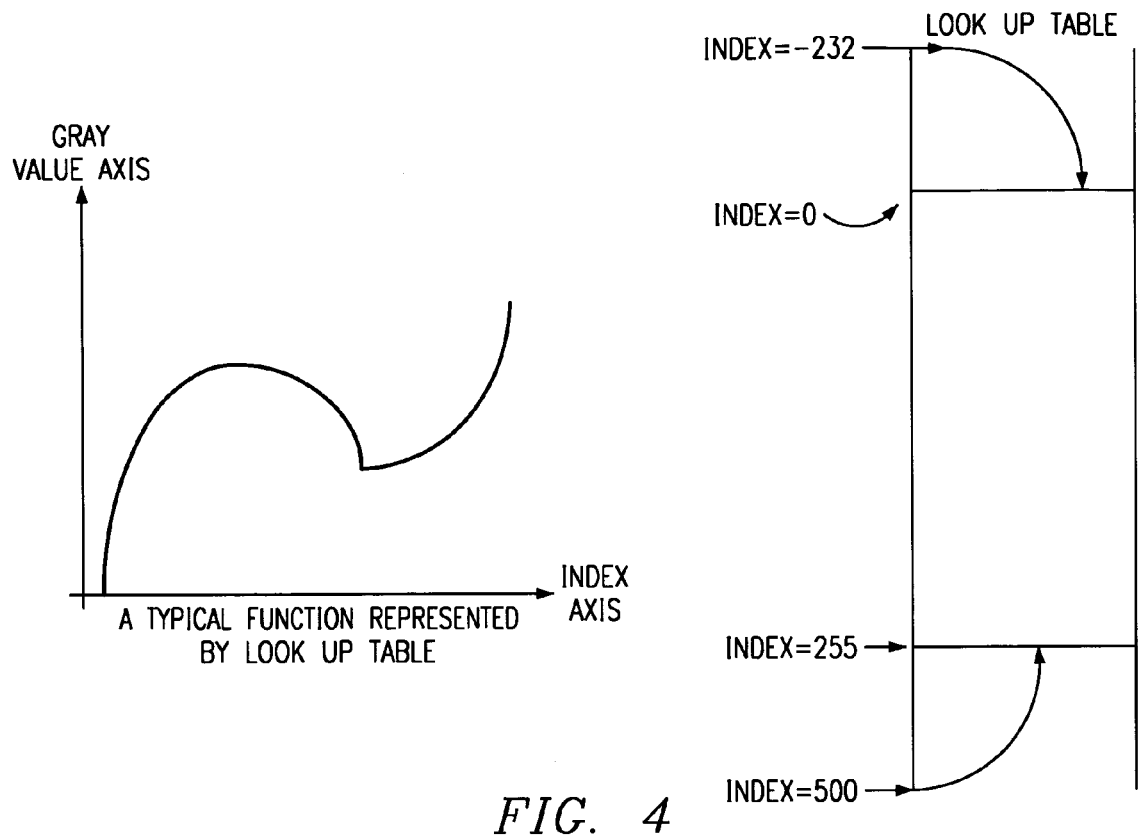
FIG. 4 illustrates a typical function and lookup table indexing.

The lookup table 19 can represent any complex function and if the index does not fall into the lookup table range, the pixel is rendered with the grey value corresponding to the closest boundary index as shown in FIG. 4. As shown in FIG. 4 an index of −232 is the same as index 0 and an index of 500 is the same as index 255.

In the prior art, the following operations are implemented.
1. Calculate the index depending upon joint value and Deltas in both x and y directions.
2. Compare the index with zero. If it is less than zero the index is equal to zero.
3. Similarly compare the index with 255. It is more than 255 it is kept at 255.
4. Using the index value get the grey value from the lookup table and render the given pixel.

The implementation of this approach in operations in assembly code requires about 4–5 clocks for each pixel.

Figure 2:
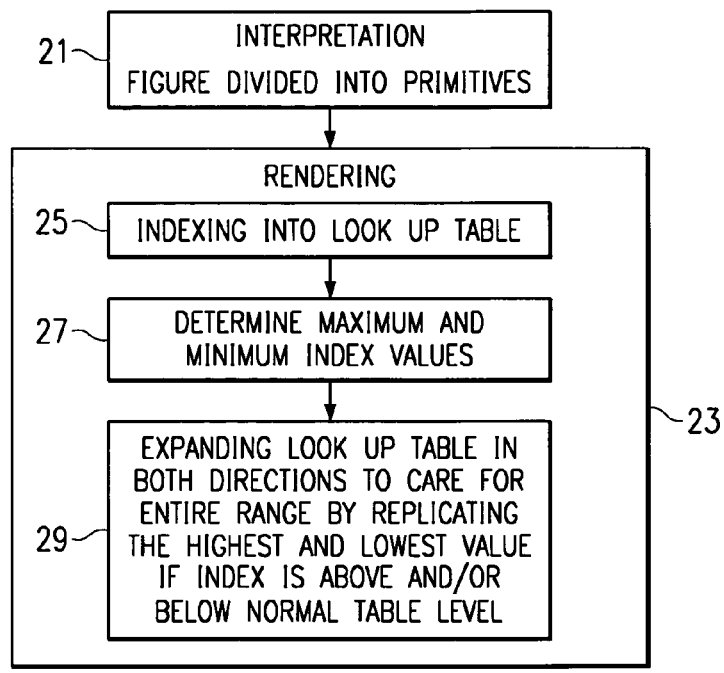
FIG. 2 is a flow chart of the steps in RIP.

In accordance with the present invention for a given lookup table, maximum and minimum values of index values are determined as illustrated by step 27 in FIG. 2. The lookup table is expanded in both directions to take care of these maximum and minimum values as illustrated by step 29 in FIG. 2. The checks in the core loop are removed. This reduces the total rendering clock count.

Figure 5:
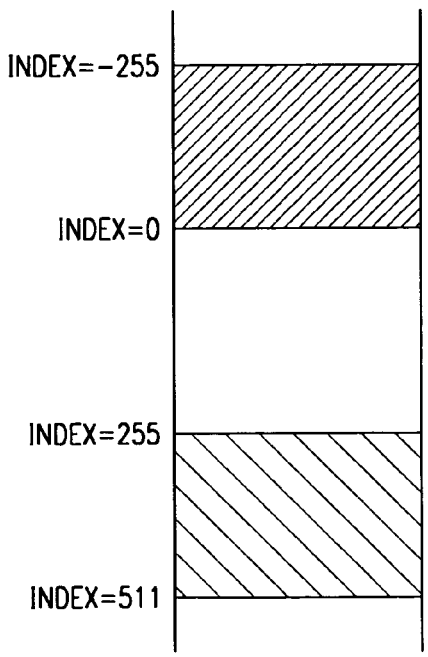
FIG. 5 illustrates lookup table expansion.

In the embodiment presented above the lookup table is expanded to take care of this maximum range of −255 to 512. As illustrated in FIG. 5 the value at index 0 is replicated from −1 to −255 index values and the value at index 255 is replicated from 256 to 511 index values.

The core loop written in algebraic assembly language for, Texas Instruments TMS 320 C82 DSP processor is as follows:

START_LINE_X:
   LX1=Gray_value>>16
     ||temp=b *(La_look_up+[LX1])
END_LINE_X:
   *La_band_buffer++=b temp
     ||Gray_value=Gray_value+Delta_X
     .cjump START_LINE_X The core loop takes exactly two clocks.

This approach takes 2 clocks where existing approach takes around 4–5 clocks for rendering a simple pixel.

The invention claimed is:

1. A printer comprising:
a printing device;
a printer controller for controlling said printing device, said printer controller including means for interpreting responsive to each line of source language to translate into machine language and then execute and wherein a figure to be printed is divided into graphics rendering primitives and means for rendering where each and every pixel in the primitive is a function of its position the primitive, said means for rendering includes a lookup table that includes opcode values over all values of indexes wherein the index into the lookup table is calculated for every pixel using a base value and a gradient in both x and y directions and said means for providing opcode values for all values of indexes includes an opcoder and means for determining maximum and minimum values of index of normal table area of a lookup table, and expanding the lookup table above and below said maximum and minimum values of said index by replicating the highest value if the index is above the normal table value and replicating the lowest value if the index is below the normal table area and removing core loop checks.

2. A raster image processor for preparing data for raster output comprising:
an interpreter for translating source language into machine language and dividing figure drawn into primitives; and
a rendering subsystem including a means for generating an index for each pixel in each of said pixels, said rendering subsystem including means for determining maximum and minimum values of index of normal table area of a lookup table and rendering an expanded lookup table for the entire range of index values and removing core loop checks; said rendering lookup table of said rendering subsystem has its highest and lowest values replicated above and below the normal table indexes so as to provide lookup table values for the entire range of indexes.

3. In a system for rendering pixels having an opcoder having two boundary checks for the index to avoid accessing outside normal lookup table area of a lookup table, the improvement for reducing the time for rendering pixels comprising:
means for determining maximum and minimum values of said index of said normal table area of said lookup table,
means for expanding the lookup table above and below said maximum and minimum values of said index by replicating the highest value if the index is above the normal table area and replicating the lowest value if the index is below the normal table area and
means for removing said boundary checks.

4. A method for reducing the time for rendering pixels in a system having an opcoder having two boundary checks for the index to avoid accessing outside normal lookup table area of a lookup table comprising the steps of:
determining maximum and minimum values of said index of said normal lookup table area of said lookup table,
expanding the lookup table above and below said maximum and minimum values of said index by replicating the highest value if the index is above the normal lookup table area and replicating the lowest value if the index is below the normal lookup table area and
removing said boundary checks.

* * * * *